United States Patent
Bueter et al.

(10) Patent No.: US 9,644,698 B2
(45) Date of Patent: May 9, 2017

(54) DEVICE FOR THE PURPOSE OF INFLUENCING THE TRANSFER OF VIBRATION BETWEEN TWO UNITS

(71) Applicant: Fraunhofer-Gesellschaft zur Förderung der angewandten Forschung e.V., Munich (DE)

(72) Inventors: Andreas Bueter, Darmstadt (DE); Enrico Janssen, Darmstadt (DE); Samuel Gaisbauer, Darmstadt (DE)

(73) Assignees: Fraunhofer-Gesellschaft Zur Forderlung Der Angewandten Forschung E.V., Munich (DE); Hochschule Darmstadt, University of Applied Sciences, Darmstadt (DE)

( * ) Notice: Subject to any disclaimer, the term of this patent is extended or adjusted under 35 U.S.C. 154(b) by 0 days.

(21) Appl. No.: 13/789,910

(22) Filed: Mar. 8, 2013

(65) Prior Publication Data
US 2013/0233998 A1     Sep. 12, 2013

(30) Foreign Application Priority Data
Mar. 9, 2012 (DE) .................. 10 2012 004 808

(51) Int. Cl.
F16F 7/10     (2006.01)
F16F 7/116    (2006.01)

(52) U.S. Cl.
CPC .......... *F16F 7/1005* (2013.01); *F16F 7/1022* (2013.01); *F16F 7/116* (2013.01)

(58) Field of Classification Search
CPC ......... F16F 7/1005; F16F 7/1022; F16F 7/116
USPC ....... 248/560, 562, 618, 636, 637, 638, 646, 248/648; 267/136, 164.28; 188/378, 188/380; 73/662, 663, 665; 700/280, 700/281
See application file for complete search history.

(56) References Cited

U.S. PATENT DOCUMENTS

| | | | |
|---|---|---|---|
| 4,405,101 A | | 9/1983 | Carlson et al. |
| 4,546,426 A | * | 10/1985 | Hafner et al. .................. 700/33 |
| 4,573,592 A | * | 3/1986 | Oliphant ........................ 212/294 |
| 4,674,638 A | * | 6/1987 | Oliphant ........................ 212/294 |
| 5,285,995 A | * | 2/1994 | Gonzalez et al. ............ 248/550 |
| 5,813,626 A | | 9/1998 | Zoppitelli et al. |
| 6,036,162 A | * | 3/2000 | Hayashi ........................ 248/550 |
| 6,202,492 B1 | * | 3/2001 | Ohsaki ............................ 73/662 |

(Continued)

FOREIGN PATENT DOCUMENTS

| | | |
|---|---|---|
| DE | 31 34 533 A1 | 6/1982 |
| DE | 197 11 846 A1 | 10/1998 |

(Continued)

*Primary Examiner* — Nkeisha Smith
(74) *Attorney, Agent, or Firm* — Fitch, Even, Tabin & Flannery LLP (57) ABSTRACT

The invention is a device for influencing transfer of vibration between two units, one is mounted so that it can vibrate and the other is mounted to be damped. A parallel circuit is connected indirectly or directly with both units, which comprises at least one elastically deformable element, with an associated first force path and at least one force generator, providing a second force path, oriented parallel to the first force path and associated with a lever, connected indirectly or directly with the one unit, which lever at one end is rotated about a first axis of rotation oriented orthogonally to both force paths.

9 Claims, 6 Drawing Sheets

(56) References Cited

U.S. PATENT DOCUMENTS

| | | | |
|---|---|---|---|
| 6,523,695 B1* | 2/2003 | Ueta et al. | 267/136 |
| 6,563,128 B2* | 5/2003 | Lublin et al. | 250/548 |
| 6,872,961 B2* | 3/2005 | Jacques et al. | 250/548 |
| 7,069,114 B2* | 6/2006 | Morisada | 700/280 |
| 7,571,793 B2* | 8/2009 | Warmerdam et al. | 188/378 |
| 7,942,379 B2* | 5/2011 | Heiland | 248/618 |
| 8,170,225 B2* | 5/2012 | Heiland | 381/71.1 |
| 2010/0057260 A1* | 3/2010 | Fallahi | 700/280 |
| 2010/0204881 A1* | 8/2010 | Muragishi et al. | 701/36 |
| 2010/0211225 A1* | 8/2010 | Heiland | 700/280 |
| 2012/0158191 A1* | 6/2012 | Rijnveld et al. | 700/280 |
| 2012/0267505 A1* | 10/2012 | Guest et al. | 248/560 |

FOREIGN PATENT DOCUMENTS

| | | |
|---|---|---|
| DE | 10 2010 021 867 A1 | 12/2011 |
| WO | WO 03/021127 A2 | 3/2003 |

\* cited by examiner

DEVICE FOR THE PURPOSE OF INFLUENCING THE TRANSFER OF VIBRATION BETWEEN TWO UNITS

CROSS REFERENCE TO RELATED APPLICATION

Reference is made to German Patent Application Serial No. 10 2012 004 808.4, filed on Mar. 9, 2012, which application is incorporated herein by reference in its entirety.

BACKGROUND OF THE INVENTION

Field of the Invention

The invention relates to a device for the purpose of influencing the transfer of vibration between two units, one of which is mounted so that it can vibrate, and the other of which is mounted such that it can be damped, with a parallel circuit.

Description of the Prior Art

Figure 2:
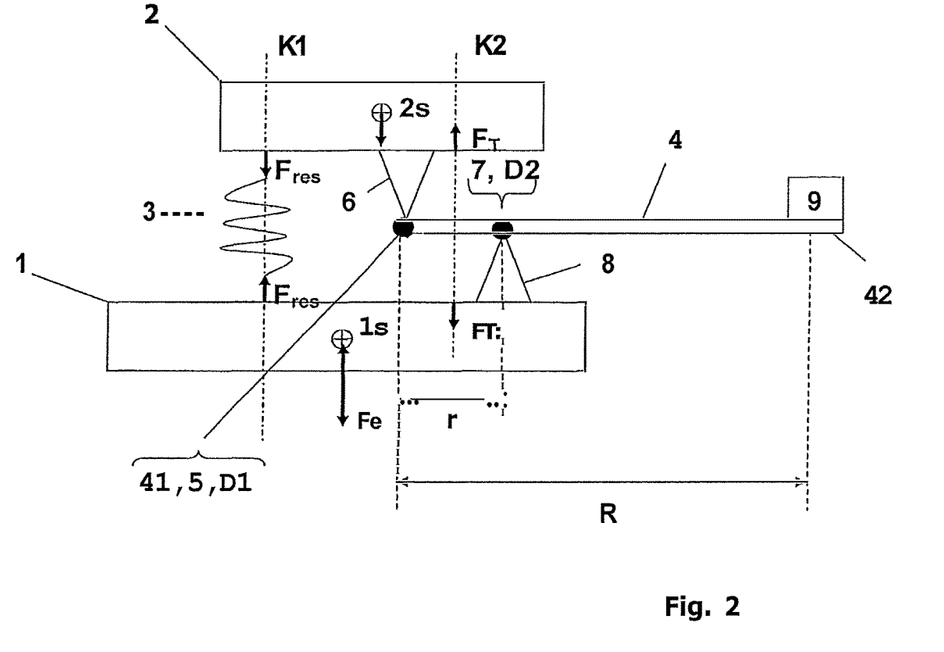
FIG. 2 shows a passive anti-resonance force isolator in accordance with the prior art.

A device known as a dynamic anti-resonance force isolator is disclosed in U.S. Pat. No. 3,322,379, and serves to provide decoupling of vibration between a unit subjected to parasitic vibrations, and a unit that is to be damped with respect to the parasitic vibrations. In particular the device, by means of appropriate matching to the main frequency of excitation of the unit subjected to the parasitic vibrations, is able to isolate completely the unit that is to be damped with respect to the parasitic vibrations. For this purpose the device makes use of a mechanically driven pendulum as a force generator which is introduced in parallel to an elastically deformable support spring between the unit subjected to the parasitic vibrations and the unit that is to be damped. Such an anti-resonance force isolator arrangement of known art is schematically represented in FIG. 2. A unit 1 is mounted such that it can vibrate while being mounted opposite to a unit 2 that is to be damped. Thus the vibrating unit 1 represents a base plate, at whose center of gravity 1s an exciting force $F_e$ acts, directed in one dimension and in two directions, which sets the unit 1 into vibration. In the interests of a clearer representation a one degree of freedom system is supposed, in which force components that are oriented in two directions act between the two units 1 and 2 just along or parallel to a single force axis. For the purpose of vibration isolation, or vibration reduction, an elastically deformable support spring 3 is provided between the vibrating unit 1 and the unit 2 that is to be damped. The spring forms a first force path K1, along which both static and dynamic force components are transferred. Parallel to the support spring 3, a force isolator, designed as a pendulum mechanism, is provided between the vibrating unit 1 and the unit 2 that is to be damped, by which inertial forces originating from the pendulum mechanism are introduced along a second force path K2 that is oriented in parallel to the first force path K1. To this end the force generator provides a lever 4, whose one end of the lever arm 41 is mounted such that it can rotate by a rotary bearing 5 about a first axis of rotation D1 that is oriented orthogonally to both force paths K1 and K2. For its part, the rotary bearing 5 is securely anchored via an attachment 6 with the unit 2 that is to be damped. At a distance r from the rotary bearing 5, extending from the first axis of rotation D1, the lever 4 is mounted on a second rotary bearing 7 such that it can rotate about a second axis of rotation D2, which is oriented in parallel to the first axis of rotation D1. The second rotary bearing 7 is securely anchored via an attachment 8 with the vibrating unit 1. A massive body 9 is attached on the end of the lever arm 42 that is mounted such that it can freely vibrate, and is opposite to the end of the lever arm 41, which end of the lever arm 42 is distanced from the first axis of rotation D1 by the lever arm length R. The body 9 is mounted such that it can pivot in two directions about the axis of rotation D2, and, as a function of the acceleration acting at the location of the body, generates an inertial force $F_T$ acting along the second force path K2 in the direction of deflection. It is necessary to select the inertial force $F_T$ that can be introduced along the second force path K2 with respect to magnitude, frequency and phase such that the inertial forces $F_T$ acting along the second force path K2 fully compensate for, and thus eliminate, the resonance forces $F_{res}$ acting in the event of resonance along the first force path K1 via the support spring 3 between the resonantly vibrating unit 1 and the unit 2 that is to be damped. The mode of operation that underlies the force generator, which is designed as a lever mechanism, thus operates so that the lever mechanism as a function of its inertia is set into anti-resonance compared with the resonant vibration behavior of the vibrating unit 1. As a result of the dynamic component of the spring force $F_{res}$ and the dynamic force being generated by the force resonator, by virtue of the relative movement between the vibrating unit 1 and the unit 2 that is to be damped, act in opposition and with equal strength at the location of the center of gravity 2s of the unit 2 that is to be damped. Thus a maximum isolation of vibration between the vibrating unit 1 and the unit 2 that is to be damped is present at a fixed prescribed resonant frequency, to which the anti-resonance frequency of the force generator is set by the adjustment of particular parameters describing the kinematics of the lever mechanism. To this end it is in particular necessary to coordinate the following parameters with one another: the mass of the unit 2 that is to be damped, the mass of the massive body 9, the spring stiffness k of the at least one support spring 3, the lever ratio $Q_R=R/r$, and the massive moment of inertia J of the lever arm 4.

SUMMARY OF THE INVENTION

The invention is a device for influencing the transfer of vibration between two units, with one unit being mounted so that it can vibrate and the other unit is mounted such that it can be damped. A parallel circuit is connected indirectly or directly with the two units, comprising at least one elastically deformable element and at least one force generator, which a lever arm mechanism such that the anti-resonant vibration behavior of the force generator can be adaptively matched to altering resonance properties of the vibrating system. The exertion of influence onto the force generator is to be undertaken without manual intervention, and must be capable of implementation in situ on the basis of an adaptive controller. In this manner vibration isolation must always remain ensured in the event of resonance, even if the resonant frequency alters. Moreover further influence of the transfer that is transmission, of vibration must also be provided above the isolation frequency.

In accordance with the invention, two units are connected indirectly or directly with both units, comprising at least one elastically deformable element, with which a first force path is associated, and at least one force generator, with which a second force path, oriented in parallel to the first force path, is associated, and which has a lever arm, connected indirectly or directly with the one unit, which can rotate about a first axis of rotation, which is oriented orthogonally to both force paths, which lever arm at a distance r from the first axis of rotation is connected indirectly or directly with the other unit such that it can rotate about a second axis of rotation, oriented in parallel to the first axis of rotation, and which provides an end of the lever arm that is fitted with a mass, and is mounted such that it can vibrate freely.

In accordance with the invention a device for the purpose of influencing the transfer of vibration between two units, has at least one actively controllable element in one lever arm region alongside the lever, between a second axis of rotation and an end of the lever arm that is mounted such that it can vibrate and is fitted with the mass, which includes an actively controllable element dynamically influencing the moment of inertia associated with the end of the lever arm that is mounted such that it can rotate about the second axis of rotation and is fitted with the mass.

The moment of inertia and the vibration dynamics of the force generator, are essentially determined by the dimensions of the lever arm, measured from the second axis of rotation up to the end of the lever arm that is fitted with the mass, and also by the mass that is provided or attached at the end of the lever arm. By exerting influence with an actuator on at least one of the above parameters, it is possible to influence the vibration behavior and thus the dynamic reactive effect of the force generator on the parasitic vibrations from the vibrating unit acting on the force generator.

Examples of embodiments are described, in which by exerting influence with an actuator onto the force generator the anti-resonance frequency can be varied and thus adjusted within a prescribed range of frequencies to the current exciting frequency of the vibration from the vibrating unit that is to be isolated. By means of suitable active control of the at least one actively controllable element that interacts with the force generator, it is possible to adapt the anti-resonance isolation frequency, so that in this manner it can counteract effectively the resonances of the system that vary as a function of operational conditions. It is self-evident that the transfer or transmission of vibrations from the vibrating unit onto the unit that is to be damped must also be influenced in a positive manner above the anti-resonance isolation frequency.

BRIEF DESCRIPTION OF THE DRAWINGS

In what follows the invention is described in terms of examples without any limitation of the general inventive concept on the basis of examples of embodiment with reference to the figures. Here.

DETAILED DESCRIPTION OF THE INVENTION

Underlying all forms of embodiments of the invention, for an adaptively dynamic anti-resonance force isolator between a vibrating unit and a unit that is to be damped, is a force generator having the lever arm mechanism illustrated in FIG. 2, which provides an inertially-conditioned resonant vibration behavior with amplitude, frequency and phase matched for the purpose of complete elimination of the system-conditioned natural frequency of the vibrating unit. In the case of natural vibration of the vibrating unit, the lever arm mechanism generates counter-vibrations with exactly the same frequency and amplitude as the systemic natural vibrations of the vibrating unit which are displaced in phase by exactly 180° so that the resonant natural vibrations of the vibrating unit and the vibrations generated by the force generator at the location of the center of gravity of the unit to be damped are mutually eliminated.

Figure 1:
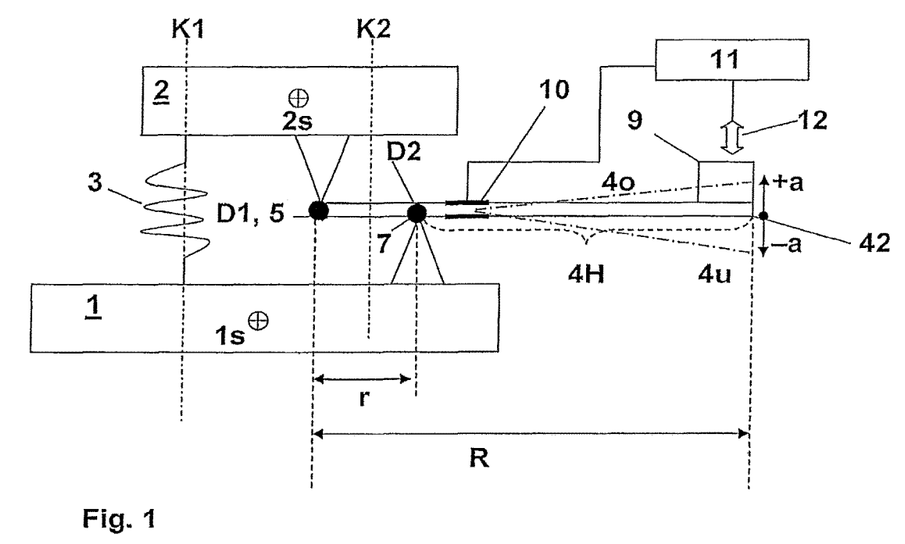
FIG. 1 shows a device for providing vibration isolation with a variably adjustable anti-resonance frequency.

In order to be able to adjust the anti-resonant vibration behavior of the force generator, a lever arm mechanism adaptively alters resonance frequencies of the vibrating unit in situ. dynamically during system operation. The lever arm mechanism illustrated in FIG. 1 provides an actively controllable element 10 alongside the lever arm 4H, which at one end is bounded by the second axis of rotation D2, and at the other end by the preferably freely-vibrating end of the lever arm 42 that is fitted with the mass. The actively controllable element 10, when it is activated, induces a mechanical compressive or tensile stress into the lever arm 4H. The stress deforms the lever arm 4H at least in the region of the actively controllable element 10. As a consequence, the stress influences at least the end of the lever arm that is fitted with the mass rotating about the second axis of rotation D2 such that the end of the lever arm 4H is accelerated in two directions longitudinally relative to the force paths K1, K2 by a magnitude a and as a consequence is in each case deflected by a displacement of magnitude w.

In order to increase the effectiveness of the at least one actively controllable element so as to increase its ability as an actuator to deform the lever locally, it is advantageous to reduce the structural strength of the lever in the region of the actively controllable element. One form of reducing structural strength is by local thinning of the lever material.

The transducer materials of variable length are suitable in principle for the purpose of implementing the actively controllable element actuators. These transducer materials are produced, for example, from piezoelectric materials, magnetostrictive materials and/or from shape memory materials. Such actuators can be applied onto the surface of the lever, which is preferably produced from a metallic material, using a fiber composite material, such as, for example a material reinforced with glass, carbon, aramide or natural fibres, or from hybrid material compositions. In the case in which the lever is produced using fiber-reinforced materials, the fiber-reinforced composite materials that are suitable are primarily those with orthotropic properties, which have directionally-dependent elasticity properties, but do not possess any coupling between strains and shear deformations. Also it is appropriate to integrate the actuators into the lever such that the actuators are protected from external influences. An integral design of the sensors and actuators within the composite structure is linked with the following advantages:

protection of the sensors and actuators from environmental influences elimination of any additional structures for attaching and housing the actuators and sensors and any therewith linked production and assembly effort (reduced complexity)

direct deformation coupling between the active element and the structure, and modularity, by virtue of the construction of a closed, functionally integrated unit.

In the case of the actuator design in FIG. 1, it is assumed that the lever arm 4H, has a cross-section of rectangular design, which provides on both its upper and lower faces an actively controllable element as close as possible to the location of the axis of rotation D2. Each element has the form of a piezoelectric actuator 10 of planar design. The two actuators 10 are controlled on the basis of an objective function of a control unit 11. The function controls the state of vibration of the mass 9 connected with the end of the lever arm 42. A sensor 12 serves to sense and register the state of vibration of the end of the lever arm 42 that is fitted with a mass. The sensor is preferably designed as a displacement sensor or an acceleration sensor. Relative vibrations between the vibrating unit and the unit that is to be damped can also be registered by sensors to obtain control signals for the control of the actuators.

In principle, it is also possible to arrange the at least one actively controllable element alongside the lever 4 between the two rotary bearings 5 and 7. However, in the following discussion, it will be assumed that the actively controllable elements 10 are applied alongside the lever arm 4H as close as possible to the location of the axis of rotation D2 of the rotary bearing 7.

The actively controllable elements 10, which are designed as planar actuators, are able by means of alterations of their length, which are matched, to translate the lever arm 4H from the horizontally straight shape represented in FIG. 1 into a shape that is curved upwards 4o or downwards 4u, as indicated by the dashed lines representing each case 4o and 4u.

For the case in which the lever arm 4H is deformed upwards, the actuators of planar design are controlled such that the actuator applied onto the upper face of the lever arm 4H is shortened, whereas the actuator attached onto the lower face of the lever arm 4H is lengthened. In this manner the surface on the upper face of the lever arm 4H in the region of the actuators experiences a tensile stress that shortens the surface, whereas the lower face of the lever arm 4H experiences a compressive stress, and/or tensile stress, that lengthens the surface locally. As a consequence, the lever arm 4H is locally deformed in the region of the actuators for the purpose of exerting the above-described upward movement. In the reverse case, it is equally possible to deflect the lever arm 4H downwards as indicated by position 4u.

As a result of the above-described deflection of the lever arm 4H that can be initiated by actuators, the mass 9 arranged at the end of the lever arm 42 experiences an acceleration oriented upwards or downwards, depending upon the deflection movement, about the second axis of rotation D2 shown in FIG. 1. Thus it is possible to impose additionally on the mass 9 mounted at the end of the lever arm 42, which is influenced by the vibrating unit 1 and the lever arm mechanism inertially-conditioned vibrations about the axis of rotation D2, suitably superimposed acceleration forces. These actions effect inter alia a virtual alteration of the mass 9, as a result of which the moment of inertia of the lever arm arrangement oriented about the second axis of rotation D2 can be altered, as can its resonant vibration behavior, and, linked with this is the anti-resonance frequency of the force generator.

The control of the actuators is undertaken by the control unit 11, which on the basis of a programmed objective function prescribes the vibration isolation effect of the lever mechanism between the two units 1 and 2.

It is self-evident that a combination of the above measures is also possible, which leads to improved behavior over the complete frequency range.

For the controlled superimposed acceleration of the end of the lever arm 42 that is fitted with the mass about the second axis of rotation D2, as can be seen in FIG. 1, further alternative configurations and attachments of actively controllable elements, in or relative to the lever arm 4H, are suitable, as can be seen in the further embodiments. In the interest of simplifying the further description just the lever arm mechanism is illustrated, comprising the lever 4, which is mounted such that it can rotate on the rotary bearings 5 and 7 about the first and second axes of rotation D1 and D2 respectively, and at whose end 42 the mass 9 is attached.

Figure 3:
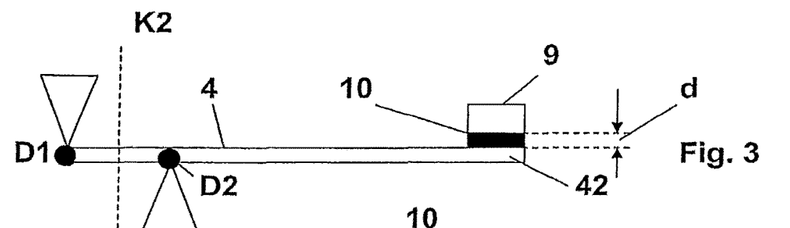
FIGS. 3 to 7 show alternative forms of embodiments in accordance with the invention for the purpose of implementing an adaptively adjustable anti-resonance force isolator.

In the case of FIG. 3 an actuator 10, having a thickness which can be altered, is introduced between the end of the lever arm 42 and the mass 9. When the actuator is activated, it increases or decreases the distance d of the mass 9 relative to the lever 4. In an equivalent manner, the actuator 10 is thus able to accelerate the mass 9 by a magnitude a along the force paths upwards or downwards, as a result of which, with suitable activation of the actuator 10, a virtual reduction or increase of the mass can be achieved. In a similar manner to the above embodiments, this embodiment is able to influence the moment of inertia of the lever 4 about the axis of rotation D2, and, associated with the latter, the anti-resonance frequency. Alterations of the thickness of actuators consisting of piezoelectric material are typically limited. In order to increase the actuator travel of piezoelectric actuators in particular, gearing units or travel ratio mechanisms that increase the actuator travel are suitable which can be provided in the form of an actuator unit between the end of the lever arm 42 and the mass 9. Such gearing units are known to the person skilled in the art, for example in the form of mechanical lever arm mechanisms, which are not the subject of the invention.

Figure 4:
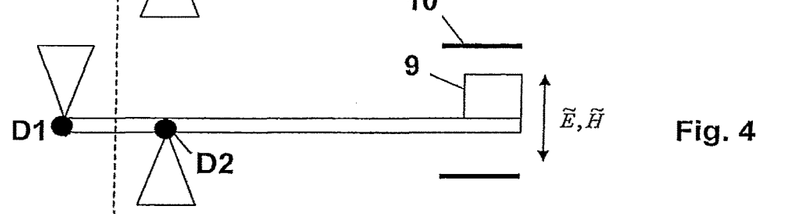

A further alternative for accelerating the mass 9 attached at the end of the lever arm and, associated with this, for exerting an active influence on the alteration of the location of the mass 9 relative to the force paths K1 and K2, provides for the utilization of externally applied electrical and/or magnetic alternating fields. In FIG. 4 it is supposed that the mass 9 consists of a permanently magnetic material. An electromagnetic arrangement with alternating magnetic polarity serves as an actively controllable element 10 which provides magnetic forces H acting on the permanently magnetic mass 9, deflecting it upwards or downwards depending upon the magnetic polarity. Alternatively it is possible, instead of using magnetic forces H, to mount the mass 9 within a condenser unit 10, in which an electric alternating field E is applied to provide electrically attracting or repelling forces which are able to accelerate the mass 9 in the above manner in two directions along the force paths K1 and K2.

Figure 5:
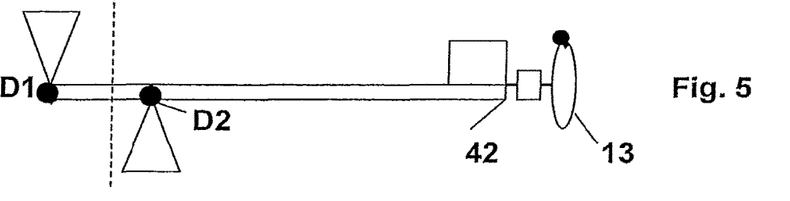

In FIG. 5 is illustrated a mechanical solution for the generation of forces in two directions for accelerating the mass 9 along the force paths K1 and K2. In this case, the end of the lever arm 42 is connected with an out-of-balance exciter in the form of a motor-driven eccentric unit 13; this generates acceleration forces, which are at least oriented in two directions along the force paths K1 and K2.

All of the embodiments elucidated in FIGS. 1, 3, 4 and 5 contain actively controllable elements which produce acceleration forces acting on the mass 9, acting along the force paths K1 and K2, as a result of which the virtual mass, which is responsible for the dynamic moment of inertia of the lever arm 4H about the axis of rotation D2, can be varied.

Figure 6:
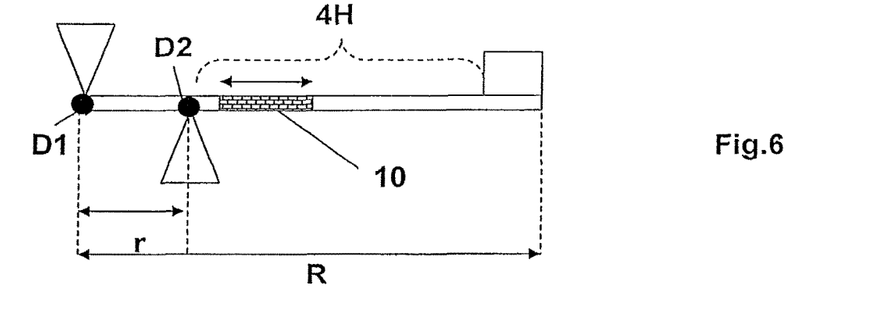

A further option for exerting an influence on the moment of inertia of the lever arm 4H oriented about the second axis of rotation D2 provides variation of the length (R-r) of the lever arm 4H (cf. FIG. 1). In FIG. 6 a lever arm arrangement is illustrated with a lever arm 4H, alongside which an actively controllable element 10 is provided. The latter is able to lengthen or shorten the lever arm 4H and as a consequence positions the end of the lever arm 42 that is fitted with the mass nearer or further from the location of the second rotary bearing D2. A possible form of implementation of the active element which is illustrated in FIG. 6 relies upon a part of the lever arm 4H from an actively controllable transducer material of variable length, from a piezoelectric or a magnetostrictive material, for example. The advantage of such materials is in their utilization of the property of shape alteration that is inherent to the material which enables a direct conversion of electrical or magnetic energy into deformation energy. Moreover such materials offer the option of implementing very compact designs in comparison to standard drives, for example. Since, however, the travel or length alteration caused by the shape alteration is limited, it is also appropriate to provide as an actively controllable element 10 a spindle mechanism that can be driven by an electric motor for the purpose of altering the length of the lever arm 4H.

Figure 7:
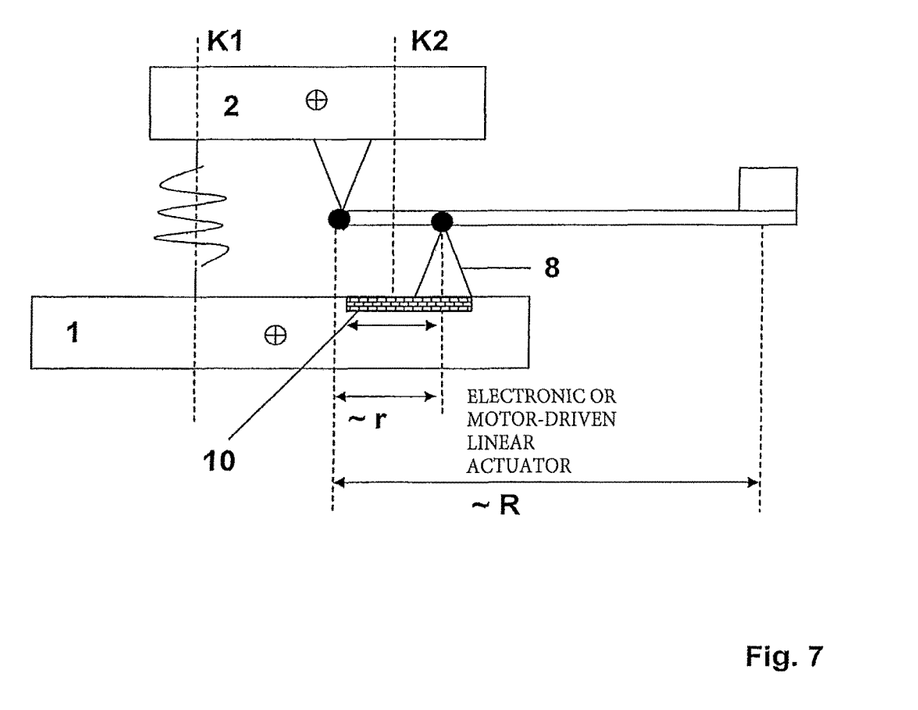

A further form of embodiment for the purpose of varying the lever arm length (R-r) uses the option of mounting at least one means of attachment 8, see FIG. 7, such that it can move linearly transverse to the track of the force paths K1 and K2, with the aid of a motor-driven linear drive 10, for example. In this manner the distance r between the first and second axes of rotation D1 and D2 can be varied, and thus the lever arm length R-r.

The device in accordance with the invention for the purpose of providing vibration isolation between a vibrating unit, structure, or component 1 and a unit, structure, or component 2 that is to be damped, can preferably be deployed for the purpose of vibration reduction between a motor unit and a structure supporting the motor unit. In particular in land, water or air vehicles the vibration-isolating device can contribute to the damping of vibrations of the bodywork of the motor vehicle or rail vehicle, or of the hull of a ship, or of an aircraft structure. The vibration damping measures contribute not only to the comfort of using the respective means of transport, in particular they also increase significantly the operating lives of components that are subjected to vibration. The measures in accordance with the invention for reducing or compensating for vibrations also enable components subjected to vibration to be designed less massively, especially since the components are subjected to lower mechanical loads.

The device in accordance with the invention is also suitable for reducing the vibration of at least one component or structure that is sensitive to vibration relative to a vibrating environment, such as, for example, a vibrating supporting structure. Such applications find deployment in particular in the technology of precision measurements, microscopy, and chip production.

Figure 8:
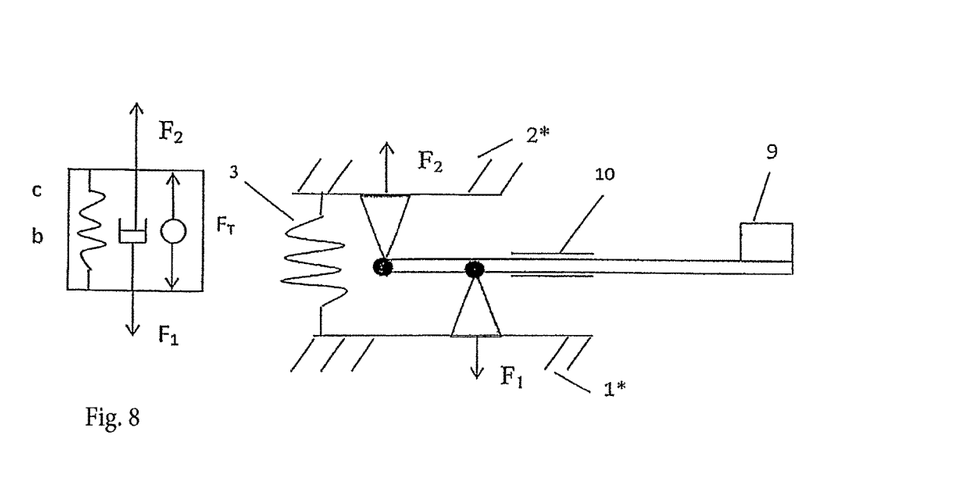
FIGS. 8 to 10 show further embodiments in accordance with the invention.
Figure 9:
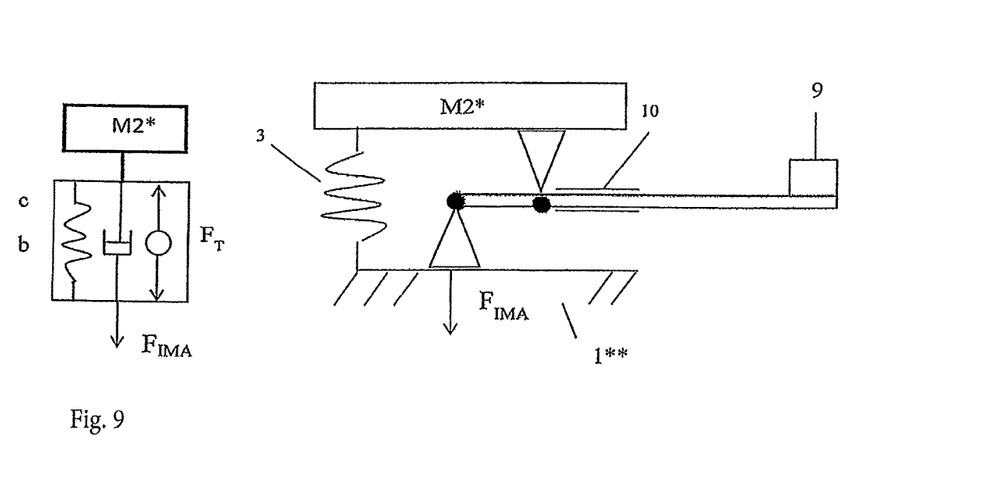
Figure 10:
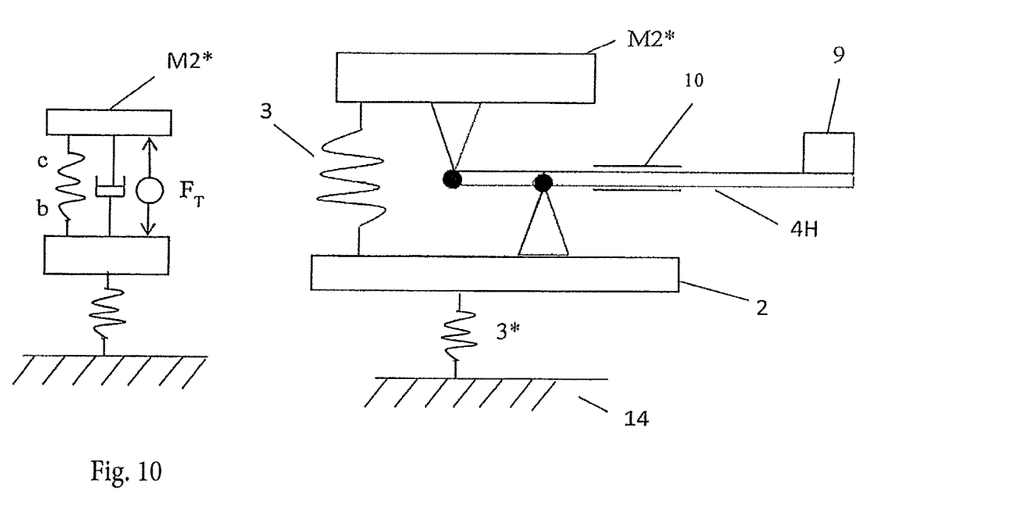

FIGS. 8 to 10 reproduce a summarizing overview on the basis of equivalent mechanical circuit diagrams in the form of pictograms, of respectively preferred examples of application and deployment for the device in accordance with the invention, for the purpose of influencing the transfer of vibration between two units.

FIG. 8 shows the case in which the force generator is designed as an actively controllable lever arm mechanism functioning as an active bearing that is attached between a first unit 1* and a second unit 2*. Here the first unit 1* is at rest, that is, securely anchored, and the second unit 2* is mounted such that it can vibrate relative to the first unit 1*. By means of suitable control, for example, by means of time-wise periodic control of the actively controllable element 10, bearing forces F1, F2 can be generated on both units, which, by virtue of the mounting of the second unit 2* such that it can vibrate, lead to its spatial deflection in two directions. By means of a suitable lever arm length ratio the bearing force F2 acting on the second unit 2* can be selected to be greater than the bearing force F1 acting on the first unit 1*. Moreover the stiffness c and the damping action b of the active bearing can be prescribed by means of at least one elastically deformable element 3 attached between the two units 1*, 2*.

FIG. 9 shows an inertial mass actuator, with which the unit M2*, which is fitted with a mass and mounted such that it can vibrate, is mounted in a freely vibrating manner on the structure 1 that is to be influenced, and interacts with the force generator designed as a lever arm mechanism such that forces $F_{IMA}$ that initiate vibration act upon the unit 1 that is mounted such that it can vibrate, via the actively controllable lever mechanism. In this case also, the stiffness c and the damping action b can be prescribed by means of at least one elastically deformable element 3 attached between the two units M2* and 1**.

FIG. 10 shows the case of an adaptive dynamic vibration absorber, whose task it is to extract vibration energy from a vibrating system 2, and preferably to convert this energy into another form of energy, preferably to dissipate it. For this purpose, the unit 2 that is to be damped is connected via at least one elastically deformable element 3* with a vibrating system 14, which thus excites the system 2 into undesired vibrations. The unit 2 that is to be damped is connected via an actively controllable lever mechanism with a unit M2* that is mounted such that it can vibrate freely. With the aid of the actively controllable element 10 alongside the lever arm 4H, the resonant vibrating behavior of the lever arm mechanism is to be adjusted precisely such that the vibrating system 2 provides maximum vibrational excitation of the mass M2*, as a result of which a maximum of vibration energy is extracted from the vibrating system 2. In this case also, the stiffness c and the damping action b can be prescribed by means of at least one elastically deformable element 3 attached between the two units 2, M2*.

REFERENCE SYMBOL LIST

1 Vibrating unit
2 Unit that is to be damped
3 Elastically deformable element, support spring
4 Lever
4H Lever arm
41 End of the lever arm
42 End of the lever arm that is fitted with a mass
5 First rotary bearing
6 Means of attachment
7 Second rotary bearing
8 Means of attachment
9 Mass
10 Actively controllable element
11 Control unit
12 Sensor
13 Out-of-balance exciter
14 Vibrating system
K1, K2 Force path
r Distance between first and second axes of rotation
R Length of the lever 4
1s Center of gravity of the vibrating unit
2s Center of gravity of the unit that is to be damped $F_T$ Force exerted by the force generator
3* Elastically deformable element
2* Unit mounted so it can vibrate
1* Unit securely mounted at rest
1** Structure that is to be influenced
c Stiffness of the elastically deformable element 3
d Damping of the elastically deformable element 3
F1 Bearing force generated by the actively controllable element 10, introduced via the attachment 8
F2 Bearing force generated by the actively controllable element 10, introduced by means of attachment 6
$F_{IMA}$ Inertial mass actuator force
M2* Unit that is fitted with a mass and mounted such that it can vibrate

The invention claimed is:

1. A device for influencing vibrations in a system including a first unit mounted to vibrate and a second unit mounted to be damped, the device comprising:
a parallel circuit for direct or indirect attachment between the first unit and the second unit, the parallel circuit including a first force path through which a first force path acts and a second force path in parallel with the first force path through which a second force path acts, at least one elastically deformable element located in the first force path, at least one force generator located in the second force path including a lever having a first end and a second end, a first rotary bearing rotatably mounting the lever at the first end thereof about a first axis of rotation which is oriented orthogonally to both the first force path and the second force path, a second rotary bearing rotatably mounting the lever about a second axis of rotation which is oriented parallel to the first axis of rotation and the first axis of rotation and the second axis of rotation are spaced apart, a mass located at the second end of the lever which is mounted to vibrate, a first attachment for attaching the second rotary bearing to the first unit, a second attachment for attaching the first rotary bearing to the second unit, at least one of the first attachment and the second attachment upon attachment to the first and second units are linearly moveable relative to the first and second units by at least one actively controllable element which changes a moment of inertia of an end of the lever by altering a distance between the first axis of rotation and the second axis of rotation by altering a location of one of the first axis of rotation and the second axis of rotation relative to one of the first unit and the second unit.

2. The device in accordance with claim 1, wherein the at least one actively controllable element comprises a spindle driven by an electric motor.

3. The device in accordance with claim 1, wherein the at least one actively controllable element comprises a transducer material selected from the group: piezoelectric, magnetostrictive and shape memory materials.

4. The device in accordance with claim 1, comprising:
at least one sensor of at least one state of vibration at an end of the lever which carries the mass and relative movements between the first unit that is mounted to vibrate with the at least one sensor generating a sensor signal and an evaluation unit, which in response to said sensor signal, generates a control signal for controlling the at least one actively controllable element.

5. The device according to claim 1, wherein the first unit is at least one motor.

6. The device according to claim 1, wherein the first unit is a motor of a vehicle.

7. The device according to claim 1, wherein the first unit is sensitive to vibrations and the second unit is a support structure for the first unit.

8. The device according to claim 1, wherein the at least one force generator includes a bearing for coupling at least one of vibrations and moments of forces triggering vibration into the first unit and the second unit is anchored.

9. The device in accordance with claim 1, wherein:
the at least one actively controllable element either damps, provides active elimination of damping, or an adjustable natural frequency of an active isolation system.

* * * * *